US012600854B2

(12) United States Patent (10) Patent No.: US 12,600,854 B2
Soon-Shiong et al. (45) Date of Patent: Apr. 14, 2026

(54) ARAGONITE-BASED POLYMER MATERIALS

(71) Applicant: Nant Holdings IP, LLC, Culver City, CA (US)

(72) Inventors: Patrick Soon-Shiong, Culver City, CA (US); Patrick Lahmann, Gadsden, AL (US); Alyson Myers, Gadsden, AL (US)

(73) Assignees: Nant Holdings IP, LLC, Culver City, CA (US); Calcean Minerals and Materials, LLC, Gadsden, AL (US)

( * ) Notice: Subject to any disclaimer, the term of this patent is extended or adjusted under 35 U.S.C. 154(b) by 628 days.

(21) Appl. No.: 17/633,127

(22) PCT Filed: Aug. 7, 2020

(86) PCT No.: PCT/US2020/045451
§ 371 (c)(1),
(2) Date: Feb. 4, 2022

(87) PCT Pub. No.: WO2021/030201
PCT Pub. Date: Feb. 18, 2021

(65) Prior Publication Data
US 2022/0275203 A1 Sep. 1, 2022

Related U.S. Application Data

(60) Provisional application No. 62/885,007, filed on Aug. 9, 2019.

(51) Int. Cl.
C08L 67/04 (2006.01)

(52) U.S. Cl.
CPC ........... C08L 67/04 (2013.01); C08L 2205/03 (2013.01)

(58) Field of Classification Search
CPC .............................. C08L 67/04; C08L 2205/03
See application file for complete search history.

(56) References Cited

U.S. PATENT DOCUMENTS

| | | | |
|---|---|---|---|
| 5,480,827 A | 1/1996 | Guillemin et al. | |
| 6,022,517 A * | 2/2000 | Fairchild ............... | C01F 11/181 |
| | | | 423/432 |
| 2009/0036566 A1 | 2/2009 | Li et al. | |
| 2010/0216909 A1* | 8/2010 | Berg Gebert .......... | C08L 67/04 |
| | | | 523/128 |
| 2012/0022199 A1* | 1/2012 | Sigmund .............. | D21H 17/675 |
| | | | 524/425 |
| 2013/0101774 A1* | 4/2013 | MacLeod ................ | C08L 23/06 |
| | | | 524/427 |
| 2014/0272357 A1* | 9/2014 | He .......................... | B32B 27/12 |
| | | | 524/427 |
| 2016/0017134 A1* | 1/2016 | Desille ................... | C08K 3/013 |
| | | | 524/451 |

| | | | |
|---|---|---|---|
| 2016/0230043 A1* | 8/2016 | Mania .................. | C08K 5/5419 |
| 2018/0265371 A1 | 9/2018 | Paynter et al. | |
| 2019/0040217 A1* | 2/2019 | James .................... | B33Y 70/10 |
| 2020/0079961 A1* | 3/2020 | Werner ............... | C09D 17/004 |
| 2021/0277227 A1* | 9/2021 | Vucak ....................... | C09C 1/02 |

FOREIGN PATENT DOCUMENTS

| | | |
|---|---|---|
| EP | 2 952 543 A1 | 12/2015 |
| EP | 3 272 799 A1 | 1/2018 |
| EP | 3 318 599 A1 | 5/2018 |
| WO | 2010/146574 A1 | 12/2010 |
| WO | 2017/077539 A1 | 5/2017 |
| WO | 2020/219974 A1 | 10/2020 |

OTHER PUBLICATIONS

ExxonMobil, "OptemaTM TC 110 Blown Product Datasheet," 2017, ExxonMobil, pp. 1-2 (Year: 2017).*
Uster, Benjamin, "Waste Mussel Shells to Treat Acid Mine Drainage: A New Zealand Initiative," 2014, Reclamation Matters, pp. 23-27 (Year: 2014).*
Chaudhuri, Saabira, "Lego Struggles to Find a Plant-Based Plastic That Clicks", The Wall Street Journal, Jun. 12, 2019, pp. 1-5.
Kon et al., "Osteochondral regeneration with a novel aragonite-hyaluronate biphasic scaffold: up to 12-month follow-up study in a goat model", Journal of Orthopaedic Surgery and Research, vol. 10, No. 81, 2015, pp. 1-17.
Omari et al., "Calcium Carbonate", Profiles of Drug Substances, Excipients, and Related Methodology, Chapter 2, Elsevier, vol. 41, 2016, pp. 31-132.
Runt et al., "Polymer blends and copolymers", Handbook of Thermal Analysis and Calorimetry. vol. 3: Applications to Polymers and Plastics, Chapter 8, 2002, pp. 273-294.
Setiawan et al., "Blending of Low-Density Polyethylene and Poly-Lactic Acid with Maleic Anhydride as a Compatibilizer for Better Environmentally Food-Packaging Material", The 4th International Conference on Advanced Materials Science and Technology, Materials Science and Engineering, vol. 202, Article 012087, 2017, pp. 1-8.
Shogren et al., "Biodegradation of starch/polylactic acid/poly(hydroxyester-ether) composite bars in soil", Polymer Degradation and Stability, vol. 79, 2003, pp. 405-411.
International Search Report and Written Opinion received for PCT Application Serial No. PCT/US2020/045451 dated Nov. 19, 2020, 10 pages.
International Preliminary Report on Patentability received for PCT Application Serial No. PCT/US2020/045451 dated Feb. 17, 2022, 8 pages.

(Continued)

*Primary Examiner* — Robert S Jones, Jr.
*Assistant Examiner* — Joshua Caleb Bledsoe
(74) *Attorney, Agent, or Firm* — Umberg Zipser LLP; Martin Fessenmaier; Priti Phukan

(57) ABSTRACT

Compositions, methods, and uses of aragonite biobased polymer plastic compositions are presented having increased strength and stiffness as well as improved recyclability and/or biodegradability. The aragonite biobased plastic compositions include aragonite blended in a dispersion with a biobased polymer and optionally includes a petroleum-based polymer and/or a compatibilizer.

10 Claims, 8 Drawing Sheets

(56)               References Cited

OTHER PUBLICATIONS

Extended European Search Report received for EP Patent Application Serial No. 20852047.8 dated Aug. 7, 2023, 11 pages.

Liu et al., "Effects of Calcium Carbonate Polymorph on the Structure and Properties of Soy Protein-Based Nanocomposites", Macromolecular Bioscience, vol. 8, No. 5, May 13, 2008, pp. 401-409.

Liu etal., "3D scaffold of PLLA/pearl and PLLA/nacre powder for bone regeneration", Biomedical Materials, vol. 8, No. 6, Nov. 14, 2013, pp. 1-9.

Carla etal., "Sintese e Caracteriza9ao de Nanoconpositos de Celulose/CaC03", Disseration, URL:https://ria.ua.pt/bitstream/10773/3030/1/2008001827.pdf, Jan. 1, 2008, 92 pages.

* cited by examiner

Calcite

Aragonite

Vaterite orange
filament

ARAGONITE-BASED POLYMER MATERIALS

This application claims priority to and the benefit of U.S. Provisional Application No. 62/885,007 filed on Aug. 9, 2019, entitled ARAGONITE-BASED POLYMER MATE-RIALS, the entire content of which is incorporated herein by reference.

FIELD OF THE INVENTION

The present disclosure relates to compositions and methods for producing aragonite-based polymer materials, including biobased plastic compositions for replacing or reducing petroleum-based plastic compositions.

BACKGROUND OF THE INVENTION

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In the United States for the year 2010, more than 191 million barrels of liquid petroleum gas (LPG) and natural gas liquids (NGL) were used to make plastic products, representing nearly 3% of the total U.S. petroleum consumption. Accordingly, Federal and State governments in the United States and abroad, as well as brand owners are increasing pressure on the industry to reduce its dependence on petrochemical-based plastics and packaging.

For example, the renowned company Lego A/S has spent several years trying to make its blocks with plastic derived from plants to replace the currently used acrylonitrile butadiene styrene (ABS). But, they have yet to succeed to form a plant-based or any bio-based plastic having the hardness, shear strength, and stability of the petroleum-based ABS. (S. Chaudhuri, Jun. 12, 2019, *The Wall Street Journal*.)

Furthermore, mineral fillers used to enhance properties of plastics are not renewable or sustainable as they are mined from land deposits that are millions of years old.

Calcium carbonate is one of the most widely used mineral fillers in the plastics industry, and its use in rigid packaging has increased significantly over the years. While once thought of as simply a resin extender, the addition of calcium carbonate in plastics has been shown to contribute to increased performance, improved processing, and improved sustainability of the finished product.

Furthermore, calcium carbonate is one of the most abundant materials found in the earth's crust and it forms rock types of limestone and chalk. Calcium carbonate is also the most abundant chemical sediment in modern and most ancient oceans, making up roughly 10% of the ocean sediments. (M. M. H. Al Omani et al., Chapter Two, Calcium Carbonate, page 34, *Profiles of Drug Substances, Excipients, and Related Methodology*, Vol. 41, 2016 Elsevier Inc. ISSN 1871-5125.)

Calcium carbonate in nature generally exists in two forms: calcite or aragonite. A third and less stable form of calcium carbonate is vaterite which is rare due to its solubility in water. Aragonite is formed naturally in all mollusk shells and in the calcareous endoskeletons of warm- and cold-water corals. Aragonite also accumulates as inorganic precipitates from marine cements in the ocean. While aragonite shares the same chemistry with calcite, aragonite is a polymorph of calcite having different symmetry and crystal structure from calcite. With reference to FIG. 1, in aragonite, the carbonate ions lie in two planes that point in opposite directions. This bi-planar configuration destroys the trigonal symmetry that is characteristic of calcite's structure. Aragonite's bi-planar structure gives rise, in turn, to aragonite's orthorhombic symmetry and relative instability at high temperature. Amorphous calcium carbonate can form into aragonite in specific conditions (e.g., coral-growing conditions). Additionally, aragonite confers increased shear stress and stability in lower pH conditions compared to calcite.

The properties of aragonite make it useful in various circumstances. For example, Kon et al., 2015, *J. Orthop. Surg. Res.* 10:81 report that aragonite can be used as a tissue scaffold (e.g., aragonite-hyaluronate (Ar-HA) scaffold) that is used for osteochondral regeneration. WO 2010/146574 to Altschuler reports that aragonite-based scaffolds can be used for repair, regeneration, enhancement of formation of cartilage and/or bone. U.S. Pat. No. 5,480,827 to Guillemin reports that porous polycrystalline aragonite can be used as a support material for cell culture.

Considering the environmental consequences of petroleum-based plastics in view of the lack of effective alternatives for stiffer plastic products and the need for a renewable mineral filler, there is a need to advance the plastics industry to produce a biobased plastic composition that is an effective replacement for a petroleum-based plastic (e.g., ABS) with a reduced environmental impact and/or reduced use of petroleum-based plastics.

SUMMARY

Disclosed herein are various compositions of, methods for, and use of aragonite-based compositions in a biobased plastic composition. Preferably, the aragonite biobased plastic composition comprises a blend of a biobased polymer and aragonite, and optionally includes one or more petroleum-based polymers.

Examples of biobased polymers in the contemplated aragonite biobased plastic composition include any polymer derived from a living matter (e.g., a biomass) or produced from monomers derived from a living matter that can be deformed or shaped under rheological conditions. More specifically, the biobased polymers include aliphatic bioesters, starch-based plastics, cellulose-based plastics, protein-based plastics, protein-lipid-based plastics, and blends thereof. In some preferred embodiments, the biobased polymers blended with aragonite to form a biobased plastic composition include polylactic acid (PLA) and aliphatic biopolyesters such as polyhydroxyalkanoates (PHAs) (e.g., poly-3-hydroxybutyrate (PHB), polyhydroxyvalerate (PHV) and polyhydroxyhexanoate (PHH)).

In other aspects, some biobased plastic compositions of a biobased polymer and aragonite may also include one or more petroleum-based polymers to maintain the desired plastic effect including suitable hardness, shear strength as well as recyclability and/or biodegradability. Preferably, the aragonite is milled and coated. More preferably the aragonite is ball milled and coated with steric acid. Examples of petroleum-based polymers blended with a biobased polymer and the aragonite to form the biobased plastic composition include polypropylene (PP), polyethylene (PE), polyethylene terephthalate (PET), polyvinyl chloride (PVC), polystyrene, polyester, nylon, acrylics, and blends thereof. Examples of polyethylene (PE) include high density polyethylene (HDPE), ultra-high-molecular-weight polyethylene (UHMCPE), low density polyehthylene (LDPE), linear low density polyethylene (LLDPE), and combinations thereof. In some preferred embodiments, the one or more biobased polymers is PLA and the one or more petroleum-based polymers is one or more selected from PE and a copolyester blend of 1.4-butanediol, adipic acid, and terephthalic acid (PBAT), wherein the PE is LDPE and/or LLDPE.

Preferably, the biobased plastic composition also comprises a compatibilizer for blending any immiscible polymers to allow for separation of the polymers in a recycling process and/or to confer biodegradability to the composition. The compatibilizers may be block co-polymers grafted with a biobased polymer and/or a petroleum-based polymer in the biobased plastic compositions. Examples of compatibilizers include polyethylene-grafted or polypropylene-grafted compatibilizers.

The aragonite in the biobased plastic composition may comprise a plurality of restructured argonite particles having an average diameter less than or equal to 15 μm. For example, the average particle diameter of the aragonite may be between 100 nm and 15 μm. Additionally, or alternatively, at least half of the plurality of restructured aragonite particles may have a diameter between 100 nm and 10 μm. The aragonite is contemplated to be between 1 to 80% or 1% to 50% of the total weight of the composition. In some cases, the aragonite is derived from a portion of a marine animal.

The biobased plastic composition as disclosed herein is biodegradable and/or is more readily recyclable. For example, in some embodiments, the biobased plastic composition may result in a biobased plastic material that may be used as an effective replacement for petroleum-based plastic products and may also be capable of biodegrading. Additionally, or alternatively, the biobased plastic composition may be more readily recycled. For example, in compositions including a mix of a biobased polymer and a petroleum-based polymer, the addition of a petroleum-based compatibilizer allows for easier separation of the petroleum-based polymer from the biobased polymers and/or the compatibilizer may help allow the mixing of immiscible polymers where the immiscible polymers are biobased or petroleum-based.

Further disclosed herein is a method of making an aragonite biobased plastic material comprising dispersing aragonite and the biobased polymer. In some embodiments, the method includes dispersing aragonite, the biobased polymer, and a petroleum-based polymer. Further embodiments, the method includes dispersing aragonite, the biobased polymer, the petroleum-based polymer, and a compatibilizer.

Various objects, features, aspects and advantages of the inventive subject matter will become more apparent from the following detailed description of preferred embodiments.

Various objects, features, aspects, and advantages will become more apparent from the following detailed description of preferred embodiments, along with the accompanying drawings.

DETAILED DESCRIPTION

Figure 1:
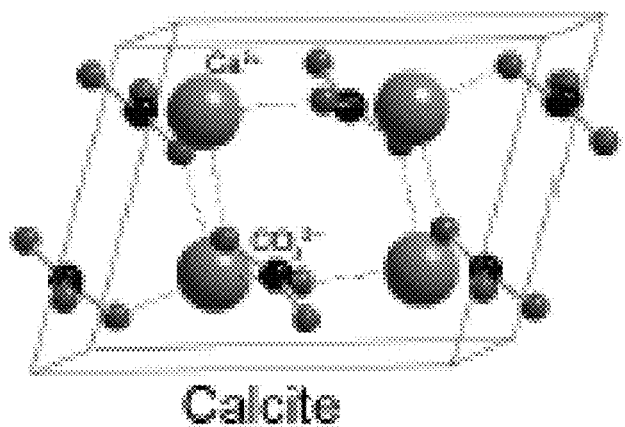
FIG. 1 shows the CaCO₃ chemical structures and symmetry for each of calcite, aragonite, and vaterite, as indicated.
Figure 1:
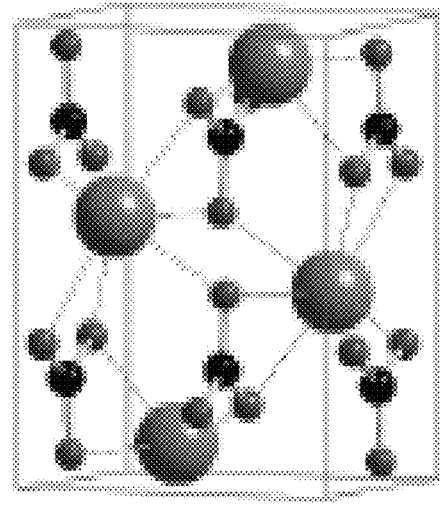
Figure 1:
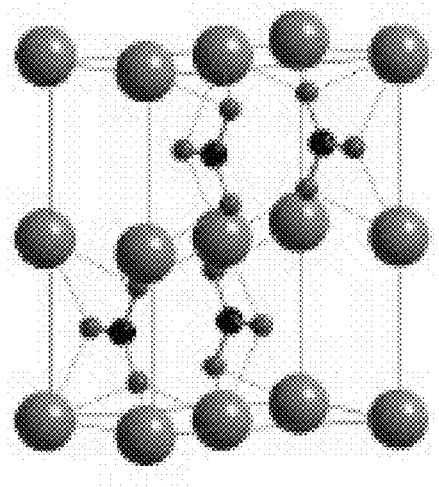

Based on the desirable properties of aragonite, the inventors contemplate a biobased plastic composition made with aragonite to produce an effective biobased plastic to replace or reduce the use of non-renewable resources as well as the use of petroleum-based plastics. Aspects of the instant disclosure include a composition of restructured aragonite blended with a plastic polymer (e.g., biobased or petroleum-based) to thereby reduce the use of non-renewable plastic fillers. The inventors have further contemplated blending aragonite with a biobased polymer to produce a plastic having comparable characteristics to a petroleum-based plastic to be used in place of or together with petroleum-based plastics. With replacement or displacement (e.g., reduction) of petroleum-based polymers, the contemplated biobased plastic composition is capable of reducing the plastic industry's reliance on petroleum-based plastics for the stronger and denser plastic products.

It is contemplated that the increased shear strength provided by aragonite (e.g., 1 to 80 weight %) blended with one or more biobased polymers provides a biobased plastic composition having an effective hardness as well as strength and stiffness (e.g., measured by flexibility) that is free of any petroleum-based polymers. However, for some compositions, depending on the desired properties for a plastic product, it may be beneficial to blend one or more petroleum-based polymers with the biobased polymer and aragonite to obtain a biobased plastic composition capable of replacing a plastic product that is made of more or of exclusively petroleum-based polymers. In some cases, in which a biobased plastic is not available, the aragonite as a renewable filler is combined exclusively with a petroleum-based plastic to obtain a plastic composition having an increased amount (e.g., up to 80%) of renewable or sustainable resources compared to plastic compositions made with non-renewable plastic fillers.

From another perspective, the contemplated aragonite biobased plastic composition has more biobased content than comparable petroleum-based plastics. In some embodiments, the biobased content of the aragonite biobased plastic composition can be measured and compared with other comparable petroleum-based compositions using the ASTM D6866 method certify the biologically derived content of bioplastics in view of the amount of carbon-14 (14C) in the product. Biomass products can have relatively high amounts of 14C, whereas exclusively petroleum-derived compositions will not have any 14C.

The addition of aragonite in polymer blends decrease surface energy and provide opacity and surface gloss, which improves surface finish. In addition, when the particle size is carefully controlled, aragonite helps increase both impact strength and flexural modulus (stiffness). When mixed with a polymer, aragonite may increase rigidity, thereby increasing stability of the plastic at higher temperatures. Advantageously, aragonite has increased hardness compared to calcite. Specifically, aragonite (e.g., unstructured or structured) has a hardness of 3.5 to 4 using the Mohs hardness scale.

In some aspects of the contemplated aragonite plastic composition is a blend of aragonite and a plastic polymer (e.g. biobased plastic polymer and/or petroleum-based plastic polymer). More specifically, the aragonite is dispersed with at least one plastic polymer. Using aragonite as a non-polymer component provides increased strength to the composition while also acting as a filler to reduce the amount of non-renewable plastic fillers. Preferably, the aragonite makes up about 1 to 80% by weight of the total plastic and aragonite composition. In some embodiments, the aragonite makes up of or between 1 to 80%, 1 to 75%, 1 to 70%, 1 to 65%, 1 to 55%, 1 to 50%, 1 to 45%, 1 to 40%, 1 to 35%, 1 to 30%, 1 to 25%, 1 to 25%, 1 to 15%, 1 to 10%, or 1 to 5% by weight of the total plastic composition. Typically, the aragonite makes of or between about 5 to 80%, 5 to 70%, 5 to 60%, 5 to 50%, 5 to 40%, 5 to 30%, 5 to 20%, or 5 to 10% by weight of the total plastic composition. More typically, the aragonite makes up of or between about 10 to 80%, 10 to 70%, 10 to 60%, 10 to 50%, 10 to 40%, 10 to 30%, or 10 to 20% by weight of the total plastic composition. Most typically, the aragonite makes up of or between about 20 to 80%, 20 to 70%, 20 to 60%, 20 to 50%, 20 to 40%, or 20 to 30% by weight of the total plastic composition. In additionally preferred embodiments, the aragonite makes up of or between about 20 to 60%, 20 to 50%, or 20 to 40% by weight of the total plastic composition.

As explained herein, aragonite can be processed to recrystallize and/or reform in various shapes for various uses while taking advantage of the mechanical and chemical properties of the aragonite minerals. Thus, in one especially preferred aspect, the aragonite minerals can be unstructured into amorphous molecular configurations, which can then be restructured/recrystallized into a desired crystalline form or shape.

Any suitable sources of aragonite are contemplated. For example, aragonite can be obtained from mollusk shells and calcareous endoskeletons of warm- and cold-water corals, or as inorganic precipitates as marine cements. With reference to FIG. 1, the superior performance (e.g., increased shear strength and hardness) of aragonite is attributed to its morphological differences (e.g., particle aspect ratio and density). It is further contemplated that where the aragonite minerals are obtained from organic sources, it is preferred that the organic molecules (e.g., proteins, lipids, etc.) in the aragonite minerals are removed through any suitable procedures (e.g., protease treatment, etc.) before further processing.

In particular embodiments, the aragonite biobased plastic composition is capable of replacing the hard petroleum-based plastic compositions as a more environmentally friendly substitute in respective products. Taking advantage of the shear strength imparted by the aragonite, in some embodiments, the contemplated aragonite biobased plastic compositions have a flexural strength (MPa) of or between 45 MPa to 270 MPa. In still other embodiments, the aragonite biobased plastic composition has a flexural strength of or between 45 to 200 MPA, 45 to 150 MPa, 45 to 125 MPa, 45 to 100 MPa, 45 to 90 MPa, 45 to 85 MPa, 45 to 80, 45 to 75, 50 to 200, 50 to 150 MPa, 50 to 125 MPa, 50 to 100 MPa, 50 to 90 MPa, 50 to 85 MPa, 50 to 80 MPa, 50 to 75 MPa, 50 to 70 MPa, 60 to 200 MPa 60 to 150 MPa, 60 to 125 MPa, 60 to 100 MPa, 60 to 90 MPa, 60 to 85 MPa, 60 to 80 MPa, 60 to 75 MPa, 60 to 70 MPa, 65 to 200, 65 to 150 MPa, 65 to 125 MPa, 65 to 100 MPa, 65 to 90 MPa, 65 to 85 MPa, 65 to 80 MPa, 65 to 75 MPa, 65 to 70 MPa, 70 to 150 MPa, 70 to 125 MPa, 70 to 100 MPa, 70 to 90 MPa, 70 to 85 MPa, 70 to 80 MPa, or 70 to 75 MPa.

Additionally or alternatively, the aragonite biobased plastic composition may have a flexural modulus (GPa) of or between 2.0 to 7.5 GPa. In more specific embodiments, the aragonite biobased plastic composition has a flexural modulus of or between 2.0 to 6.5 GPa, 2.0 to 6.0 GPA, 2.0 to 5.5 GPa, 2.0 to 5.0 GPa, 2.0 to 4.5 GPa, 2.0 to 4.0 GPa, 2.0 to 3.5 GPa, 2.0 to 3.0 GPa, or 2.0 to 2.5 GPa.

In further advantageous aspects of the inventive subject matter, the biobased plastic composition has increased recyclability and/or biodegradability. It will be appreciated by the skilled person in the art that while recyclability and biodegradability can be related, they are indeed distinct properties and both are desirable for any plastic composition. For example, a biobased polymer is not necessarily biodegradable, but it may be recyclable.

Recyclability of a plastic is the capability to break down the polymer or polymers in the plastic to a re-useable/reformable form. Accordingly, with respect to recyclability, a plastic composition that is made of one type of a biobased polymer is often more easily recyclable because it does not require separation of blended polymers. The inventors note that recyclability is often misleading given some plastics are in theory recyclable, but the required recycling process is not practical to separate some polymer blends due to the particular polymers to be separated and/or the availability of the required recycling process and facility to carry out the separation. In other words, a percent recyclability of a product may not be accurate if the amount of recyclable content is not practical to recycle. As such, in some embodiments, a biobased plastic composition including aragonite is contemplated having polymer components that can be practically separated and reprocessed.

In further embodiments, the inventors contemplate a biobased plastic composition of more than one polymer blended with aragonite that has improved recyclability in that the polymers are modified to be more easily separated and processed. As mentioned, while it may be feasible to reuse the blended composition without reforming or reshaping it for limited applications (e.g., reuse of the formed plastic composition), it is not necessarily feasible to separate the polymer blend to obtain polymers that can be reformed. To this end, compatibilizers are used to facilitate the miscibility of otherwise immiscible polymers to form the biobased plastic composition and allow for easier separation of the polymers from the plastic after use.

In an exemplary aspect, a biobased polymer and aragonite composition may comprise a biobased polymer (e.g., polylactic acid (PLA), PHB, etc.) and aragonite as well as a petroleum-based polymer (e.g., polyethylene (PE), polypropylene (PP), PE/PP blends, polyethylene terephthalate (PET), etc.) The blending of the biobased polymer and the petroleum-based polymer with aragonite can result in a biobased plastic composition having an effective shear strength and density comparable to an exclusively petroleum-based polymer plastic (e.g., acrylonitrile butadiene styrene (ABS)). However, while there may be suitable processes for blending the biobased polymer and the petroleum-based polymer without grafting, upon recycling (also referred to as reprocessing), the polymers having different polarities effect the morphology during reprocessing (e.g., under high temperature and/or high pressure conditions), and controlling the morphology is necessary for successful recycling of the polymer components. Accordingly, in order to easily blend polymers having different polarities and easily separate these polymers after use of the plastic product, it is necessary to graft the polymers together using a compatibilizer. Grafting with compatibilizers is disclosed in the art. See, e.g., Setiawan et al., 2017, (IOP Conf. Series: Materials Science and Engineering 202; doi:10.1088/1757-899X/202/1/012087) Furthermore, examples of PE- and PP-based compatibilizers include polyethylene-grafted maleic anhydride (PE-g-MAH), PE-co-octene (PEO), and PP-based olefin block copolymers (PP-OBC), as disclosed respectively in Vervoot et al., 2018 (ibid) and Setiawan et al., 2017, (IOP Conf. Series: Materials Science and Engineering 202; doi:10.1088/1757-899X/202/1/012087).

Accordingly, in preferred embodiments, the biobased plastic composition having more than one type of polymer blended with aragonite is capable of (1) forming a biobased plastic product having an effective shear strength and density to replace plastics formed from exclusively petroleum-based polymers, and (2) forming a biobased plastic product that has improved recyclability—e.g., it is more easily reprocessed and separated to allow for reforming and shaping.

With respect to biodegradability, in some aspects of the inventive subject, the inventors contemplate an aragonite biobased plastic composition having increased biodegradability. Biodegradability may be measured using any conventional calculation. For example, anaerobic biodegradability may be measured following ASTM D5511-02 and/or ASTM D5526. More specifically, ASTM D5511-12 and ASTM D5526-12 are testing methods that comply with international standards such as the ISO DIS 15985 for the biodegradability of plastic. Accordingly, in some embodiments, the contemplated aragonite biobased plastic composition is effectively capable of replacing (e.g., substituting for) an exclusively petroleum-based plastic (e.g., ABS) for plastic products and has improved biodegradability compared to an exclusively petroleum-based plastic. In still further embodiments, the contemplated aragonite biobased plastic composition is (1) effectively capable of replacing an exclusively petroleum-based plastic for plastic products, (2) has improved biodegradability compared to an exclusively petroleum-based plastic, and (3) has a comparable (e.g., within 10%) flexural strength and/or flexural modulus of the exclusively petroleum-based plastic.

In addition to the improved physical characteristics provided by aragonite, the selection of a biobased polymer, a blend of biobased polymers, or a blend of one or more biobased polymers and one or more petroleum-based polymers together with the aragonite allows for the skilled person to consider the requisite parameters for a particular plastic composition having exclusively or at least more petroleum-based polymers and prepare an aragonite biobased plastic composition that is an effective biobased plastic having comparable characteristics that requires less petroleum-based polymers and has improved recyclability and/or biodegradability. The possible biobased polymers in the contemplated aragonite biobased plastic composition include any polymer derived from a living matter (e.g., a biomass) or produced from monomers derived from a living matter that can be deformed or shaped under rheological conditions. More specifically, the biobased polymers include aliphatic bioesters, starch-based plastics, cellulose-based plastics, protein-based plastics, protein-lipid-based plastics, and blends thereof. In some preferred embodiments, the biobased polymers blended with aragonite to form a biobased plastic composition include polylactic acid (PLA) and/or one or more aliphatic biopolyesters such as polyhydroxyalkanoates (PHAs) (e.g., poly-3-hydroxybutyrate (PHB), polyhydroxyvalerate (PHV) and polyhydroxyhexanoate (PHH)). More specifically, polyhydroxyalkanoates (PHAs) are linear polyesters produced in nature by bacterial fermentation of sugar or lipids. PHA is more ductile and less elastic than other plastics, and it is also biodegradable. Also, with respect to PHB, PHB is produced by certain bacteria processing glucose, corn starch, or wastewater. Notably, the characteristics of PHB are similar to those of the polypropylene (PP), and therefore, PHB is a desirable biobased polymer for the contemplated composition. Additional suitable biobased polymers for the contemplated composition include polyamide 11 (P11) and polyamide 410 (P410).

In additional or alternative embodiments, the biobased polymer of the contemplated aragonite biobased plastic composition may be made using one or more starch-based plastic polymers. Starch based plastics are complex blends of starch with compostable plastics. In addition to PLA and PHAs, starch-based plastics also include polybutylene adipate terephthalate, polybutylene succinate, and polycaprolactone.

In other aspects, some biobased plastic compositions of a biobased polymer and aragonite may also include one or more petroleum-based polymers to maintain the desired plastic effect including suitable hardness, shear strength while decreasing use of non-renewable mineral fillers and/or having improved recyclability and/or biodegradability. Examples of petroleum-based polymers blended with a biobased polymer and aragonite to form the biobased plastic composition include polypropylenes (PP), polyethylene (PE), polyethylene terephthalate (PET), polyvinyl chloride (PVC), polystyrene, polyester, nylon, acrylics, and blends thereof. Examples of polyethylene (PE) include high density polyethylene (HDPE), ultra-high-molecular-weight polyethylene (UHMCPE), low density polyethylene (LDPE), linear low density polyethylene (LLDPE), and combinations thereof.

Notably, in addition to replacing or decreasing petroleum-based plastic polymers, contemplated plastic compositions conventionally made using a petroleum-based plastic polymer and a non-renewable, non-sustainable filler (e.g., calcite) may be made blending the renewable aragonite with the petroleum-based plastic polymer to obtain a comparable composition made with a renewable filler. As mentioned, not only does a plastic polymer (biobased and/or petroleum-based) blended with aragonite decrease the use of non-renewable fillers, but aragonite in these polymer blends decreases surface energy and provides opacity and surface gloss, which improves surface finish. In addition, when the particle size of the aragonite is carefully controlled, aragonite helps increase both impact strength and flexural modulus (stiffness). When mixed with a polymer, aragonite may increase rigidity, thereby increasing stability of the plastic at higher temperatures.

It should also be appreciated the aragonite materials according to the inventive subject matter may be modified to change or remove the zeta potential of the aragonite, which will significantly affect the physicochemical properties of the aragonite in the plastic polymer composition. For example, by reducing or eliminating the zeta potential of the aragonite, binding of cationic or anionic materials may be enhanced or reduced and/or particle repulsion may be enhanced or reduced.

In more specific embodiments, the presence of the biobased PLA polymer in an amount up to 40% by weight blended with one or more petroleum-based polymer allows for the aragonite biobased plastic composition to be biodegradable and/or recyclable. (Shogren et al., 2003, Polymer Degradation and Stability, 79:405-411.) For example, as disclosed herein, PLA may be grafted to another polymer in order to control morphology of the polymers during reprocessing (e.g., recycling). Furthermore, grafting of a suitable amount (e.g., 40% by weight) of PLA to any suitable polymer imparts PLA's biodegradability to the entire composition. on the polypropylene, polyethylene, and polylactic acid to form a bioplastic polymer material. In preferred aspects, the calcium carbonate is aragonite in a dispersion with polypropylene, polyethylene, polylactic acid, and polymer compatibilizers.

In an exemplary aspect of the inventive subject matter, an aragonite biobased plastic composition includes aragonite blended with a biobased polymer (e.g., a starch-based polymer or polymer blend and/or one or more aliphatic biopolyesters), and also blended with a co-polymer blend of PE and PP or PET alone. While PE, PP, and PET are petroleum-based polymers, in combination with aragonite and the biobased polymer, less of these petroleum-based polymers are required. Additionally, in combination with PLA, the PE-PP and PLA or PE and PLA blend together with aragonite and a compatibilizer renders a strong plastic composition that is recyclable and biodegradable. Moreover, PP is a tough polymer and this property is improved when PP is copolymerized with polyethylene (PE), and as blended in an aragonite plastic composition is capable of competing with materials such as the petroleum-based acrylonitrile butadiene styrene (ABS).

Additional plastic polymer blends for mixing with aragonite may include the copolyester blend of 1.4-butanediol, adipic acid, and terephthalic acid (PBAT). PBAT may be mixed with aragonite. Typically, PBAT is mixed with aragonite along with polylactic acid (PLA). More typically, aragonite is mixed with PBAT, PLA, and a low density polyethylene (LDPE) or a linear low density polyethylene (LLDPE). Preferably, the aragonite is milled (e.g., ball milled) and coated (e.g., with steric acid) prior to mixing with any plastic polymer.

For blending with the biobased plastic composition, aragonite minerals (including minerals pre-processed to remove organic molecules) may be treated with unstructuring reagents to reduce the aragonite into amorphous aragonite particle. As used herein, "unstructuring" refers to any processing that changes the crystallized structure of the aragonite in the raw material to amorphous structure or to another structure. Exemplary unstructuring reagents include acid, preferably citric acid or its salt forms such as sodium citrate, formic acid, hydrochloric acid, nitric acid, sulfuric acid, hydrogen halide, halogen oxoacid, hypochloric acid, chloric acid, perchloric acid, periodic acid, a fuorosulfuric acid, a phosphoric acid, a fluoroantimonic acid, a fluoronoric acid, a hexafluorophosphoric acid, acetic acid, gluconic acid, lactic acid, oxalic acid, tartaric acid, chromic acid, sodium dioctylsulfosuccinate, polyaspartic acid, ethylenediamine tetraacetic acid (EDTA), diethylenetriaminepentaacetic acid (DTPA), pyromellitic acid (PMA), aminotriacetic acid, aminodiacetic acid, or hydroxy polycarboxylic acid.

In some embodiments the unstructuring reagents may also include a chelator such as EDTA, or ethylene glycol-bis(β-aminoethyl ether)-N,N,N',N'-tetraacetic acid (EGTA), (1,2-bis(o-aminophenoxy)ethane-N,N,N',N'-tetraacetic acid) (BAPTA), N,N-bis(2-hydroxyethyl) glycine (Bicine), trans-1,2-diaminocyclohexane-ethylenediamine-N,N,N',N'-tetraacetic acid (CyDTA), 1,3-diamino-2-hydroxypropane-efhylenediamine-N,N,N',N'-tetraacetic acid (DPTA-OH), diethylenetriamine-N,N,N',N'',N''-pentaacetic acid (DPTA), ethylenediamine-N,N-dipropionic acid dihydrocoride (EDDP), ethylene diamine-N,N'-bis(methylenephosphonic acid) hemihydrate (EDDPO), N-(2-hydroxyethyl)ethylene-diamine-N,N',N'-triacetic acid (EDTA-OH), ethylenediamine-N,N,N',N'-tetrakis (methylenephosphonic acid) (EDTPO), O,O'-bis(2-aminoethyl), N,N'-bis(2-hydroxyben-zyl)ethylenediamine-N,N'-diacetic acid (HBED), 1,6-hexamethylenediamine-N,N,N',N'-tetraacetic acid (HDTA), N-(2-hydroxyethyl)iminodiacetic acid (HIDA), iminodi-acetic acid (IDA), 1,2-diaminopropane-N,N,N',N'-tetraacetic acid (methyl-EDTA), nitrilotriacetic acid (NTA), nitrilotripropionic acid (NTP), nitrilotris-(methylenephos-phonic acid) trisodium salt (NTPO), N,N,N',N'-tetrakis(2-pyridylmethyl)ethylenediamine (TPEN), and triethylenete-tramine-N,N,N',N'',N''-hexaacetic acid (TTHA), rhod-2, DMSA, FLUO 3, FURA 2, INDO 1, or QUIN 2.

Any suitable amounts and ratios of unstructuring reagents are contemplated. For example, the acid may comprise at least 10 wt %, at least 20 wt %, at least 30 wt %, at least 40 wt %, less than 80 wt %, less than 70 wt %, less than 60 wt %, less than 50 wt % of the total unstructuring reagent or total reaction volume including the calcium carbonate mineral reacting with the unstructuring reagent. In another example, the chelator may comprise at least 0.1 wt %, at least 1 wt %, at least 5 wt %, at least 10 wt %, less than 50 wt %, less than 30 wt %, less than 10 wt %, less than 5 wt % of the total unstructuring reagent or total reaction volume including the calcium carbonate mineral reacting with the unstructuring reagent.

In certain embodiments, the chelator in the unstructuring reagent can act as a slow decalcifier by binding ionized calcium present on the outer layer of the mineral crystal and slowly reducing the size of the crystal. In addition, the acid in the unstructuring reagent can facilitate the dissolution of the aragonite mineral. Thus, contacting aragonite mineral with unstructuring reagent will generate an aragonite slurry (amorphous aragonite particles) with more homogenous crystal sizes and/or particle sizes. Preferably, the aragonite slurry comprises particles of average diameter between 10 nm and 100 μm, preferably between 50 nm and 50 μm, and more preferably between 100 nm and 10 μm. Alternatively, the aragonite slurry comprises at least 30%, at least 50%, at least 70%, at least 90% of the particles of average diameter between 10 nm and 100 μm, preferably between 50 nm and 50 μm, and more preferably between 100 nm and 10 μm.

Additionally or alternatively, an aragonite slurry made of aragonite particles as disclosed herein will have a range of diameters with a particles size distribution (PSD). In some cases, the PSD in a batch slurry of aragonite may be controlled to be within a range or to have a maximum (e.g., not more than) size. For example, an aragonite slurry batch may have a $D_{98}$ (the maximum diameter size of 98% of the particles) at about 12 to 16 μm, with a $D_{50}$ at about 3.0 to 6.0 μm, and a $D_{10}$ at about 0.5 to 2.0 μm. Preferably, the aragonite slurry has a $D_{98}$ at about 14 to 15 μm, with a $D_{50}$ at about 4.5 to 5.5 μm, and a $D_{10}$ at about 1.0 to 1.5 μm. More preferably, the aragonite slurry has a $D_{98}$ at about 14.5 μm, a $D_{50}$ is at about 4.7 μm, and a $D_{10}$ is at about 1.1 μm.

Additionally or alternatively, the aragonite particles can be processed as disclosed in PCT/US20/029949, the entire content of which is herein incorporated by reference. Additional properties of the aragonite include a bulk density of about 40 to 50 lbs/ft³ or 0.50 to 0.60 g/cc and a true density of about 2.5 to 3.0 g/cm³. The aragonite has a low moisture content of not more than about 0.5% water. Typically, the aragonite is milled and coated (e.g., with steric acid), and the milled and coated aragonite has a low moisture content of not more than about 0.5% water. The Chemical Abstract Registry CAS number for aragonite is CAS No. 14791-73-2. CaCO3 makes up at least 98% of the aragonite with not more than about 0.30% sodium (Na), not more than 0.15% of sulfur (S), not more than 0.10% magnesium (Mg), not more than 0.05% of potassium oxide ($K_2O$), and less than 0.01% of phosphorus pentoxide ($P_2O_5$), iron, manganese, copper, zinc, lead, and/or boron.

The reaction duration or treatment time of unstructuring reagents with aragonite mineral may vary depending on the types and concentration of chelator and/or acid in the unstructuring reagents. For example, a preferred reaction duration or treatment time is sufficient to generate a calcium carbonate slurry having particles of average diameter between 10 nm and 100 μm, preferably between 50 nm and 50 μm, and more preferably between 100 nm and 15 μm, or sufficient to generate a calcium carbonate slurry, in which at least 30%, at least 50%, at least 70%, at least 90% of the particles have average diameter between 10 nm and 100 μm, preferably between 50 nm and 50 μm, and more preferably between 100 nm and 15 μm.

In preferred embodiments, the aragonite slurry is subject to vacuum rotation (spinning) and/or evaporation to remove at least 70%, at least 80%, at least 90% of the residual acid (e.g., sodium citrate, citric acid, etc.) from the slurry to increase the aragonite content in the slurry, to stop dissolution, and to facilitate the crystal formation from the amorphous particles.

Various conditions including temperature, pH, addition of crystal modifiers, water content, alcohol content, time, presence of stabilizers (also referred to as compatibilizers) (e.g., double hydrophilic block copolymers (DHBCs) composed of poly(ethylene oxide) (PEO) and poly(acrylic acid) (PAA), etc.), and/or status of slurry (e.g., shaking, spinning, etc.) may affect the speed and effectiveness of precipitation and crystal formation, as well as morphology of the crystals. Therefore, various calcium carbonate crystal morphologies can be obtained by modifying environmental conditions during aragonite precipitation and crystal formation. As used herein, "morphology" refers not only to crystal shape (e.g., cube, prism, pyramid, cuboid, elongated cuboid, elongated tube, etc.), but also to crystal size (e.g., thickness, length, diameter, etc.). For example, smaller cuboid crystals at a diameter between 1-5 μm and/or thickness may be obtained where the aragonite slurry is precipitated at room temperature with spinning condition (e.g., 4500 rpm at an angle between 30-50 degree, etc.). In another example, larger cuboid crystals or elongated cuboid crystals at a diameter of 5-10 μm and/or thickness may be obtained where the calcium carbonate slurry is precipitated at room temperature without spinning or shaking. In still another example, a dendritic, flatter crystal structure of aragonite can be obtained by addition of alcohol and/or water (e.g., at least 5 wt %, at least 10 wt %, at least 15 wt % of the calcium carbonate slurry) and/or with spinning and/or shaking the aragonite slurry during precipitation.

In additional or alternative embodiments, crystals in the aragonite slurry are purified by spray-drying to remove all non-crystalized aragonite molecules as well as other reagents contained in the aragonite slurry (e.g., acid, chelator, salt, water, alcohol, etc.). Any suitable technique/conditions of spray-drying of the slurry may be used. For example, the spray-drying operation may be carried by placing atomizing nozzles near the drying gas source and spraying the slurry concurrently or in the same direction as the flow of the drying gas at temperatures from about 200° F. to about 1500° F., preferably from about 250° F. to about 1200° F., and more preferably from about 300° F. to about 800° F.

In preferred aspects of the contemplated aragonite biobased plastic composition is blended with the restructured aragonite crystals as disclosed herein. More specifically, the aragonite is dispersed with at least one biobased polymer. Using aragonite as a non-polymer component provides increased strength to the composition while also acting as a filler to reduce the amount of petroleum-based polymers (e.g., PE and PP) required in an effective aragonite biobased plastic composition. Preferably, the aragonite makes up to 80% by weight of the total biobased polymer composition. In some embodiments, the aragonite makes of or between 1 to 80%, 1 to 70%, 1 to 60%, 1 to 50%, 1 to 45%, 1 to 40%, 1 to 30%, 1 to 20%, 1 to 15%, 1 to 10%, or 1 to 5% by weight of the total biobased plastic composition.

Methods for blending the bioplastic polymer composition of the present disclosure include suitable polymer blending methods as known and disclosed in the art. (See, e.g., Runt and Huang, 2002, "Polymer Blends and Copolymers," Handbook of Thermal Analysis and calorimetry. Vol. 3: Applications to Polymers and Plastics S. Z. D. Cheng, editor, Elsevier Science B.V. For example, blending and dispersion of aragonite, biobased polymer and optionally a petroleum-based polymer and any compatibilizer may be carried out in a single or twin-screw extruder under suitable conditions for the type (e.g., polymer type) and amounts of each component.

Considering the enhanced characteristics imparted by the addition of aragonite as a filler to a polymer plastic (e.g., improvements in heat deflection temperature, impact strength, stiffness, barrier properties, and 3D print quality), aragonite can also help streamline thermoforming applications by allowing the plastic to heat up and cool down faster. Moreover, aragonite specifically imparts increased shear strength. As such, the combination of aragonite with a biobased polymer and optionally a petroleum-based polymer and a compatibilizer, renders a biobased plastic composition that can effectively replace petroleum-based polymer plastics and being more easily recyclable and/or have increased biodegradable.

Figure 2:
FIG. 2 is a photograph of exemplary plastic pieces formed using 0, 10, 20, or 30% (by weight) aragonite mixed and processed with a plastic polymer blend, as disclosed according to embodiments of the present invention.
Figure 3A:
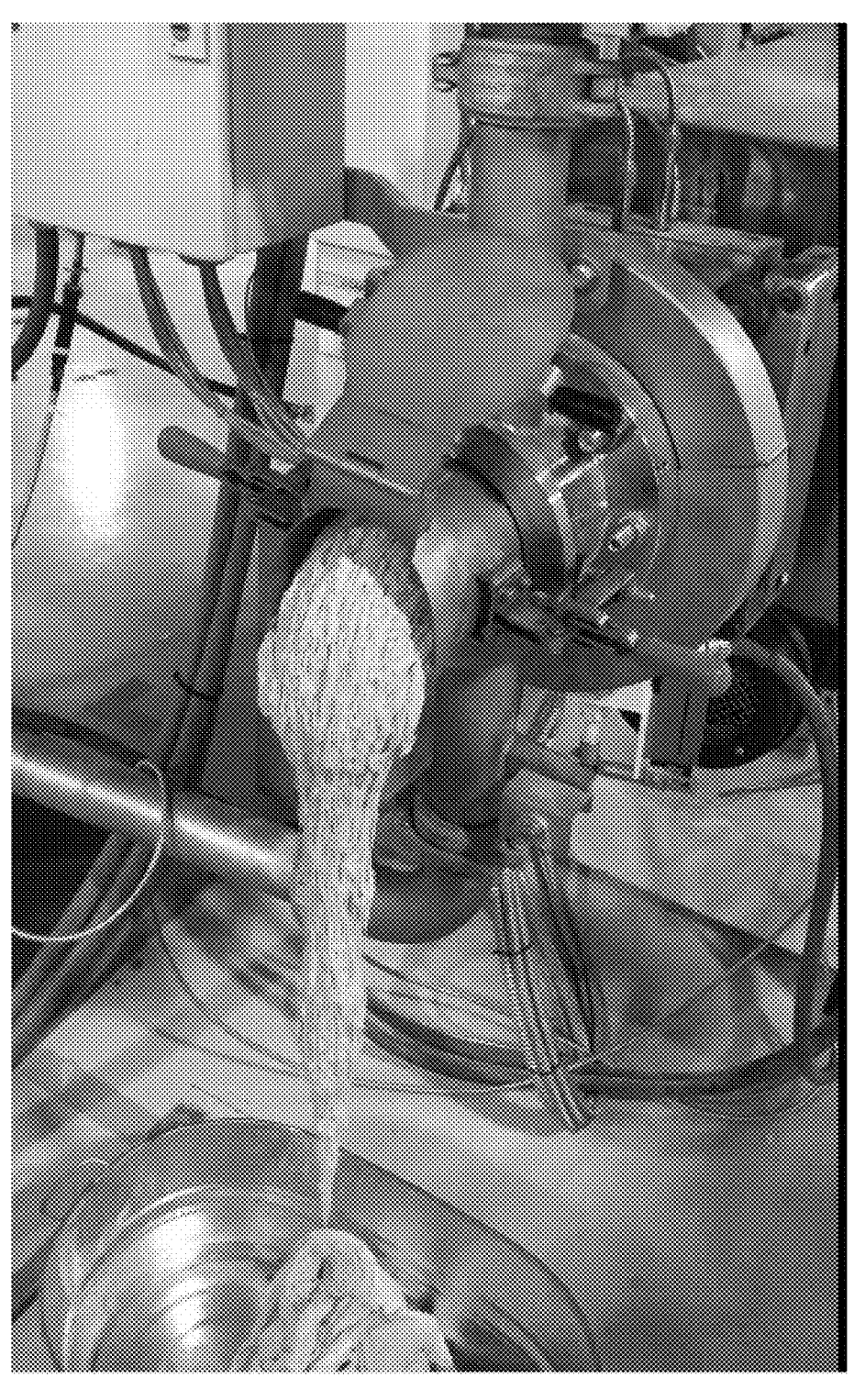
FIG. 3A is a photograph of the production of an exemplary plastic and aragonite composition as disclosed according to embodiments of the present invention.
Figure 3B:
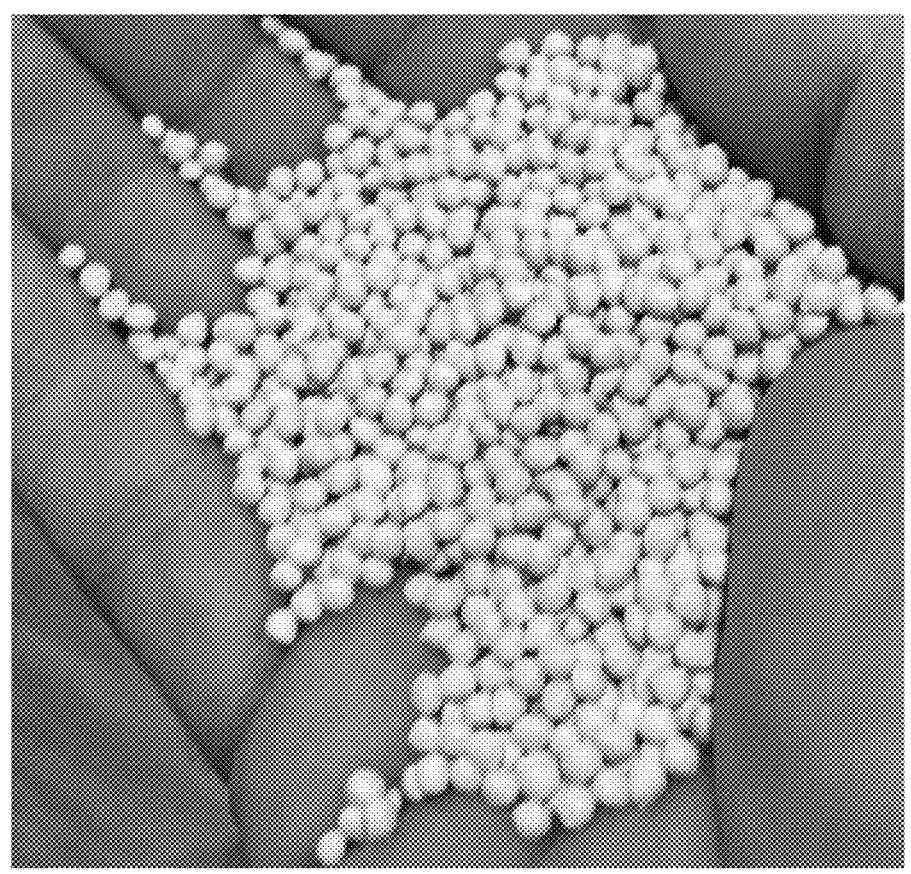
FIG. 3B is a photograph of plastic pellets formed from the exemplary plastic and aragonite composition produced as shown in FIG. 3A, as disclosed according to embodiments of the present invention.
Figure 4A:
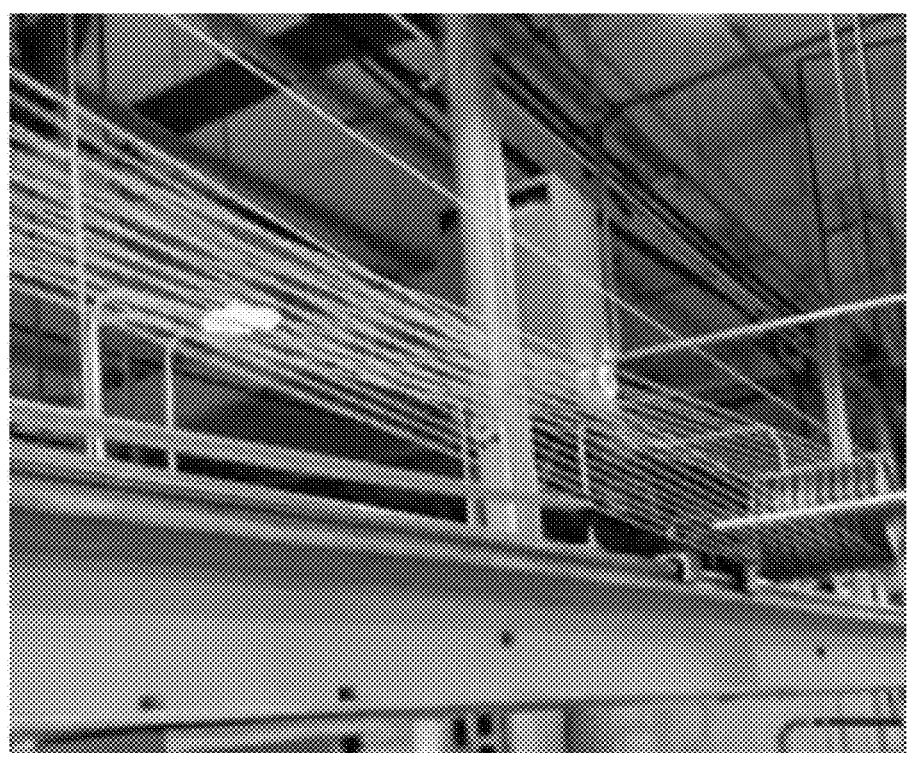
FIG. 4A is a photograph of the production of filament formed from an exemplary plastic and aragonite composition as disclosed according to embodiments of the present invention.
Figure 4B:
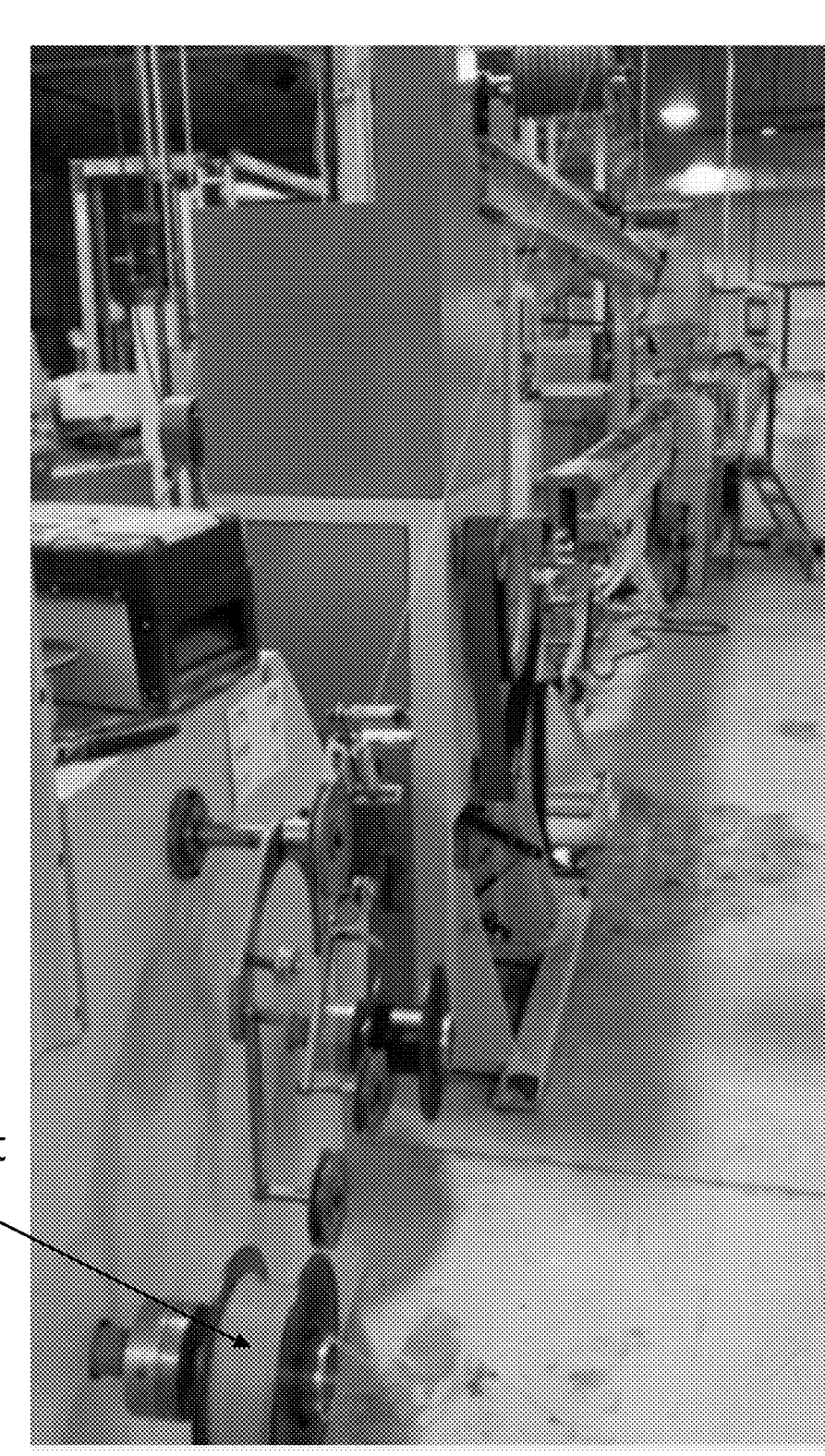
FIG. 4B is a photograph of the production of orange filament formed from an exemplary plastic and aragonite composition as disclosed according to embodiments of the present invention.

With reference to FIGS. 2, 3A-3B, 4A-4B, and FIGS. 5A-5B, plastic compositions blended with aragonite filler (e.g., milled aragonite coated with steric acid) may be used to make plastic for molding to manufacture any desired forms (e.g., FIGS. 2, 5A, 5B) using conventional plastic mixing and processing as depicted in FIGS. 3A-3B and specifically shown for transparent and orange filament manufacturing in FIGS. 4A, and 4B.

Exemplary uses for the presently disclosed aragonite biobased plastic composition include drain-waste-vent (DWV) pipe systems, musical instruments (recorders, plastic clarinets, and piano movements), golf club heads (because of its good shock absorbance), automotive trim components, automotive bumper bars, medical devices for blood access, enclosures for electrical and electronic assemblies, protective headgear, whitewater canoes, buffer edging for furniture and joinery panels, luggage and protective carrying cases, small kitchen appliances, computer keyboards, and toys (e.g., Legos®).

EXAMPLES

Aragonite particle processing. With reference to PCT/US20/029949, the aragonite particles may be processed by ball milling, as disclosed therein (e.g., FIG. 2 of PCT/US20/029949). Raw aragonite is initially processed in a feed hopper and is screened prior to entering the ball mill. Aragonite particles coming out of the ball mill are screened to reject particles outside the set size range, and then are further processed in the heat mixer.

Aragonite blended with exemplary plastic polymers to form plastic compositions for molds and filaments. Plastic and aragonite compositions for molds (FIG. 2), pellets (FIG. 3B), filaments (FIGS. 4A-4B), and molded or shaped end products (FIGS. 5A-5B) were mixed with an aragonite slurry of milled and steric acid coated aragonite as disclosed herein. Specifically, the aragonite slurry was mixed and processed with: i. PLA and PBAT; ii. PLA, PBAT, and LDPE; iii. PLA, PBAT, and LLDPE; or iv. LLDPE alone. The aragonite and plastic(s) were processed using a standard mixer and extruder system (e.g., Farrel Pomini® compact processor (CP250)). Materials used include: aragonite (OceanCal® from Calcean®), Luminy® L175 (PLA) (Total® Corbion®), Ecoflex® F Blend C1200 (PBAT) (BASF), and FUSABOND™ E226 (LDPE) (Dow®).

With reference to FIG. 2, plastic pieces as shown were formed using 0, 10, 20, or 30% (by weight) aragonite mixed with polylactic acid (PLA), a co-polyester blend of 1.4-butanediol, adipic acid, and terephthalic acid (PBAT), and an anhydride modified low density polyethylene (LDPE) resin in weight amounts as set forth in Table 1 below.

TABLE 1

| Material | Example 1 | Example 2 | Example 3 | Example 4 |
|---|---|---|---|---|
| Aragonite (OceanCal ®) | 0% | 10% | 20% | 30.0% |
| PLA (Luminy ® L175) | 100% | 87.0% | 76.6% | 66.2% |
| PBAT (ecoflex ® F Blend C1200) | | 2.0% | 2.4% | 2.8% |
| LDPE (Fusabond ™ E226) | | 1.0% | 1.0% | 1.0% |
| | | 100.0% | 100.0% | 100.0% |

With reference to FIGS. 3A-3B, a mixture of aragonite (60%) and linear low density polyethylene (LLDPE) (40%) as set forth in Table 2 was mixed as shown to produce aragonite and LLDPE pellets.

TABLE 2

| Material | |
|---|---|
| Aragonite | 60% |
| LLDPE | 40% |

With reference to FIG. 4A, aragonite was mixed with PLA, PBAT, and LDPE as set forth in Table 3 to produce a filament product.

TABLE 3

| Material | |
|---|---|
| Aragonite | 30.0% |
| PLA | 66.2% |
| PBAT | 2.8% |
| LDPE | 1.0% |

With reference to FIG. 4B, aragonite was mixed with PLA, PBAT, and LDPE as well as orange color as set forth in Table 4 to produce an orange filament product.

TABLE 4

| Material | |
|---|---|
| Aragonite | 30.0% |
| PLA | 63.2% |
| PBAT | 2.8% |
| LDPE | 1.0% |
| Orange Colorant | 3% |

Figure 5A:
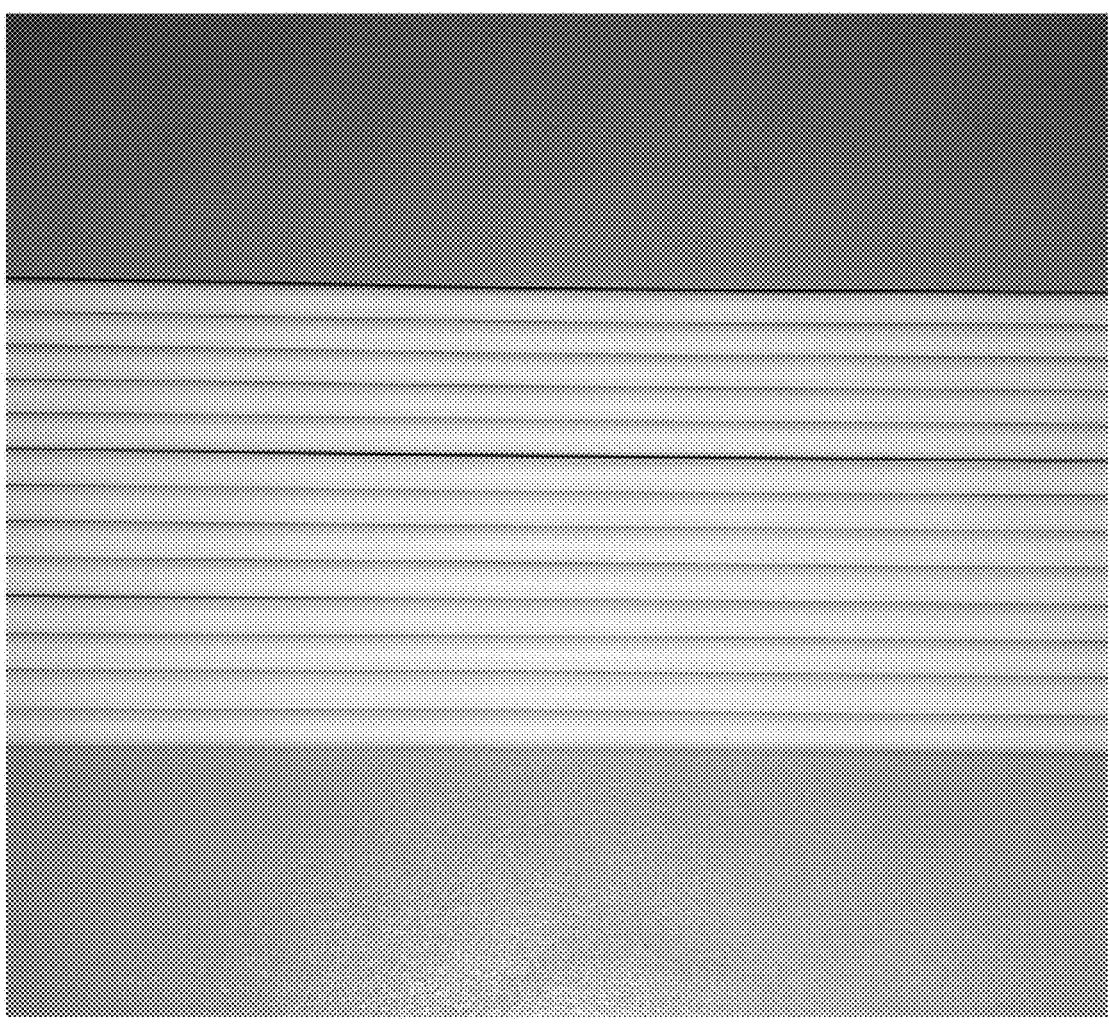
FIG. 5A is a photograph of an end use product formed using exemplary plastic and aragonite composition as disclosed according to embodiments of the present invention.

With reference to FIG. 5A, aragonite was mixed with PLA, PBAT, and LDPE as set forth in Table 5 to produce the aragonite and plastic product as shown.

TABLE 5

| Material | |
|---|---|
| Aragonite | 40.0% |
| PLA | 44.0% |
| PBAT | 15.0% |
| LDPE | 1.0% |

Figure 5B:
FIG. 5B is a photograph of and end use product formed using exemplary plastic and aragonite composition as disclosed according to embodiments of the present invention.

With reference to FIG. 5B, aragonite was mixed with PLA, PBAT, and LDPE as set forth in Table 6 to produce the molded aragonite and plastic product as shown.

TABLE 6

| Material | |
|---|---|
| Aragonite | 40.0% |
| PLA | 45.0% |
| PBAT | 15.0% |

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the full scope of the present disclosure and does not pose a limitation on the scope of the invention otherwise claimed. No language in the specification should be construed as indicating any non-claimed element essential to the practice of the claimed invention.

It should be apparent to those skilled in the art that many more modifications besides those already described are possible without departing from the full scope of the concepts disclosed herein. The disclosed subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A composition of a polymer dispersion comprising:
   restructured aragonite and one or more biobased polymers, wherein the restructured aragonite is present in an amount by weight between 9-45%, and wherein the restructured aragonite is a chemically recrystallized aragonite obtained by treatment with an unstructuring agent comprising a chelator or an acid to form an amorphous aragonite, followed by recrystallization;
   wherein the one or more biobased polymers are selected from polylactic acid (PLA), polyamide 11, polyamide 410 and blends thereof;
   wherein the composition has a flexural strength of or between 45 to 270 MPa; and
   wherein the composition has a flexural modulus of or between 2.0 to 7.5 GPa;
   wherein the restructured aragonite has a particle size distribution with D98 of 14-15 μm and a D10 of 1.0-1.5 μm.

2. The composition of claim 1, further comprising one or more petroleum-based polymers.

3. The composition of claim 2, wherein the one or more petroleum-based polymers are selected from polypropylene (PP), polyethylene (PE), polyethylene terephthalate (PET), polyvinyl chloride (PVC), polystyrene, polyester, nylon, acrylics, and combinations thereof.

4. The composition of claim 2, wherein the one or more biobased polymers is PLA and the one or more petroleum-based polymers is one or more selected from PE and a copolyester blend of 1.4-butanediol, adipic acid, and terephthalic acid (PBAT), wherein the PE is LDPE and/or LLDPE.

5. The composition of claim 2, further comprising a compatibilizer grafted to the one or more biobased polymers or the one or more petroleum-based polymers.

6. The composition of claim 5, the one or more petroleum-based polymers is a polypropylene-based or a polyethylene-based compatibilizer.

7. The composition of claim 1, wherein the composition is biodegradable or has an increased biodegradability compared to a composition having a comparable flexural strength or flexural modulus and more petroleum-based polymer content.

8. The composition of claim 1, wherein the composition is recyclable by separation.

9. The composition of claim 1, wherein the recrystallization forms from the amorphous aragonite a crystal morphology, wherein the crystal morphology is cuboid, elongated cuboid, or dendritic.

10. The composition of claim 1, wherein the aragonite is derived from a portion of a marine animal.

* * * * *